United States Patent [19]

Palmer

[11] 4,383,087
[45] May 10, 1983

[54] ORGANIC POLYMER LAYERED TRICHALCOGENIDES

[75] Inventor: David N. Palmer, Tolland, Conn.

[73] Assignee: Combustion Engineering, Inc., Windsor, Conn.

[21] Appl. No.: 345,603

[22] Filed: Feb. 4, 1982

[51] Int. Cl.$^3$ .............................. C08F 8/42; C08F 8/26
[52] U.S. Cl. ................................. 525/274; 525/332.2; 525/354; 525/359.1; 525/367; 525/368
[58] Field of Search ...................... 521/29, 31, 53, 55; 525/357, 359.1, 354, 367, 368, 332, 274

[56] References Cited

U.S. PATENT DOCUMENTS 4,230,633 10/1980 Vollhardt .............................. 521/53
4,276,395 6/1981 Vollhardt ............................. 525/357

OTHER PUBLICATIONS

Bonds et al., Jour. Am. Chem. Soc., 97:8, pp. 2128–2132, Apr. 16, 1975.

*Primary Examiner*—Paul R. Michl
*Attorney, Agent, or Firm*—Brumbaugh, Graves, Donohue & Raymond

[57] ABSTRACT

Organic polymer layered trichalcogenides, such as a cyclopentadienyl transition metal trichalcogenide-substituted styrene divinylbenzene copolymer, are useful as the cathode active material for lithium nonaqueous secondary batteries which operate on the principle of intercalation and elsewhere.

7 Claims, No Drawings

ORGANIC POLYMER LAYERED TRICHALCOGENIDES

The present invention relates to organic polymer layered trichalcogenides and to a process for their preparation.

Cathode active materials, namely, transition metal layered chalcogenides, for lithium nonaqueous secondary batteries which operate upon the principle of intercalation are well known. Representative examples of such materials and such batteries are those disclosed, for instance, in U.S. Pat. Nos. 4,009,052; 4,049,879; 4,049,887; 4,198,476; 4,206,276; 4,207,245; 4,228,226; and 4,233,377.

The object of the present invention is to provide alternative cathode active materials useful in such batteries and elsewhere and a process for preparing them.

Vollhardt et al in U.S. Pat. Nos. 4,230,633 and 4,276,385 generally disclose that a styrene divinylbenzene copolymer can be converted into a lithiated styrene divinylbenzene copolymer by the two steps (a) and (b) set forth below.

Thus, a macroreticular styrene divinylbenzene (1–20%) copolymer (100–900 Å) pore is reacted with bromine to form a brominated styrene divinylbenzene copolymer. The reaction can be conducted at ambient temperature for about 24–72 hours in the presence of a small amount of nitromethane and boron trifluoride as the etherate in the absence of light. This reaction can be represented by the following schematic equation wherein

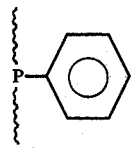

represents the styrene divinylbenzene copolymer:

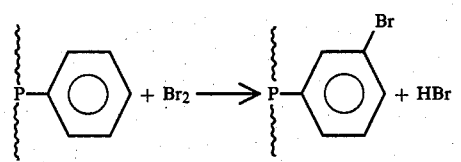

The brominated styrene divinylbenzene copolymer is reacted with about 4 M n-butyl lithium in hexane to form a lithiated styrene divinylbenzene copolymer. This reaction can be conducted at about 50° C.–80° C. for about 24–72 hours in a tetrahydrofuran medium and can be represented by the following schematic equation:

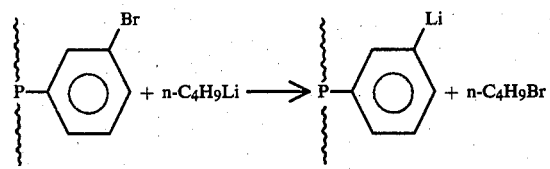

In accordance with the process of the present invention, the lithiated styrene divinylbenzene copolymer is reacted with a cyclopentadienyl transition metal trichloride to form a cyclopentadienyl transition metal trichloride-substituted styrene divinylbenzene copolymer. The reaction can be conducted in a benzene medium in the presence of methyl lithium for about 72 hours at ambient temperature. This reaction can be represented by the following schematic equation:

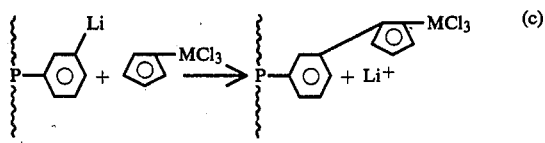

The cyclopentadienyl transition metal trichloride-substituted styrene divinylbenzene copolymer is reacted with a chalcogenide compound selected from the group consisting of a lithium chalcogenide ($Li_2X$) and a chalcogenide-bearing acid ($H_2X$) to form a cyclopentadienyl transition metal trichalcogenide-substituted styrene divinylbenzene copolymer. The reaction can be conducted in a dry, oxygen-free tetrahydrofuran medium at about 25° C. for about 24–72 hours under an argon blanket. The reaction is conducted in the presence of excess chloride ions when using a lithium chalcogenide reactant. The reaction can be represented by the following schematic equation:

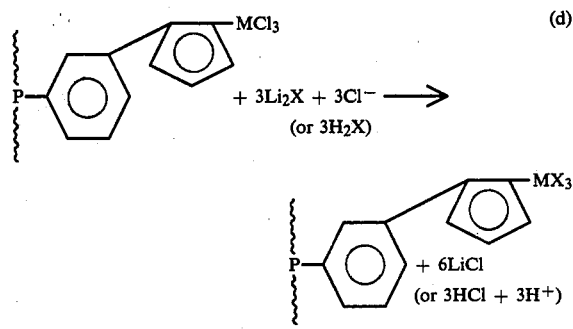

The transition metals (M) mentioned above are the metals of Groups 1b to 7b and 8 of the Periodic Table of Elements and include, for instance, titanium, vanadium, tantalum, chromium, cobalt, nickel, manganese, niobium, ruthenium, molybdenum, hafnium, zirconium, and tungsten. The above-mentioned lithium chalcogenides ($Li_2X$) include, for example, lithium oxide ($Li_2O$), lithium sulfide ($Li_2S$), lithium selenide ($Li_2Se$) and lithium telluride ($Li_2Te$), and can further contain phosphorus or a halide (bromine, chlorine, iodine). The chalcogenide-bearing acids ($H_2X$) mentioned above include, for example, hydrogen sulfide ($H_2S$), hydrogen selenide ($H_2Se$) and hydrogen telluride ($H_2Te$).

The compounds of the present invention are useful as the cathode active material for lithium nonaqueous secondary batteries which operate on the principle of intercalation. They can also be used as photogalvanic electrodes for the galvanocatalytic production of hydrogen and oxygen from aqueous electrolytes or production of methane and oxygen from alcoholic electrolytes. In addition they are useful as reforming catalysts for fuel cells, as general petrochemical catalysts or as cathode active material for primary batteries.

The process and products of the present invention are illustrated by the following representative examples thereof.

EXAMPLE 1

500 g. of macroreticular styrene divinylbenzene (20%) copolymer (600 Å pore) beads were mixed with 68 g. of bromine and reacted at ambient temperature for about 24 hours in the presence of a small amount of nitromethane and boron trifluoride as the etherate in the absence of light. 500 g. of brominated styrene divinylbenzene copolymer were recovered.

500 g. of brominated styrene divinylbenzene copolymer were mixed with 400 ml. of 3.8 M n-butyl lithium in hexane and reacted at about 50° C.-80° C. for about 24 hours in a tetrahydrofuran medium. 290 g. of lithiated styrene divinylbenzene copolymer were recovered.

50 g. of the lithiated styrene divinylbenzene copolymer were mixed with 120 g. of cyclopentadienyl titanium trichloride and reacted in a dry benzene medium in the presence of methyl lithium for about 72 hours at ambient temperature. 120g. of cyclopentadienyl titanium trichloride-substituted styrene divinylbenzene copolymer were recovered by slow precipitation or rising to the surface of the reaction medium and visual segragation by color.

100 g. of the cyclopentadienyl titanium trichloride-substituted styrene divinylbenzene copolymer were mixed with 117 g. of lithium sulfide in the presence of excess chloride ions dissolved in dry, oxygen-free tetrahydrofuran and reacted in the tetrahydrofuran medium at about 25° C. for 24 hours under an argon atmosphere. 90 g. of a cyclopentadienyl titanium trisulfide-substituted styrene divinylbenzene copolymer were recovered by slow precipitation or rising to the surface of the reaction medium and visual segregation by color.

EXAMPLE 2

100 g. of lithiated styrene divinylbenzene copolymer as produced in Example 1 were mixed with 243 g. of cyclopentadienyl vanadium trichloride and reacted in a dry benzene medium in the presence of methyl lithium for about 72 hours at ambient temperature. 240 g. of a cyclopentadienyl vanadium trichloride-substituted styrene divinylbenzene copolymer were recovered by slow precipitation or rising to the surface of the reaction medium and visual segregation by color.

200 g. of the cyclopentadienyl vanadium trichloride-substituted styrene divinylbenzene copolymer were mixed with 390 g. of hydrogen selenide dissolved in dry, oxygen-free dioxane and reacted at about 25° C. for about 24 hours. 320 g. of a cyclopentadienyl vanadium triselenide-substituted styrene divinylbenzene copolymer were recovered by slow precipitation or rising to the surface of the reaction medium and visual segregation by color.

What is claimed is:

1. A process for preparing an organic polymer layered trichalcogenide which comprises:
   reacting a lithiated styrene divinylbenzene copolymer with a cyclopentadienyl transition metal trichloride to form a cyclopentadienyl transition metal trichloride-substituted styrene divinylbenzene copolymer; and
   reacting the cyclopentadienyl transition metal trichloride-substituted styrene divinylbenzene copolymer with a chalcogenide compound selected from the group consisting of a lithium chalcogenide and a chalcogenide-bearing acid to form a cyclopentadienyl transition metal trichalcogenide-substituted styrene divinylbenzene copolymer.

2. The process as defined by claim 1 wherein the transition metal is titanium and the chalcogenide compound is lithium sulfide.

3. The process as defined by claim 1 wherein the transition metal is vanadium and the chalcogenide compound is hydrogen selenide.

4. An organic polymer layered trichalcogenide produced by the process of claim 1.

5. An organic polymer layered trichalcogenide which is a cyclopentadienyl transition metal trichalcogenide-substituted styrene divinylbenzene copolymer.

6. An organic polymer layered trichalcogenide as defined by claim 5 which is cyclopentadienyl titanium trisulfide-substituted styrene divinylbenzene copolymer.

7. An organic polymer layered trichalcogenide as defined by claim 5 which is cyclopentadienyl vanadium triselenide-substituted styrene divinylbenzene copolymer.

* * * * *